US009657880B2

(12) United States Patent
Uno et al.

(10) Patent No.: US 9,657,880 B2
(45) Date of Patent: May 23, 2017

(54) HEATING DEVICE (75) Inventors: Junichi Uno, Minato-ku (JP); Hisaaki Yamakage, Minato-ku (JP); Takeshi Funabiki, Minato-ku (JP); Yoshihito Yamada, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 870 days.

(21) Appl. No.: 13/882,920

(22) PCT Filed: Dec. 9, 2010

(86) PCT No.: PCT/JP2010/072101
§ 371 (c)(1),
(2), (4) Date: May 1, 2013

(87) PCT Pub. No.: WO2012/077209
PCT Pub. Date: Jun. 14, 2012

(65) Prior Publication Data
US 2013/0220993 A1 Aug. 29, 2013

(51) Int. Cl.
*F16L 53/00* (2006.01)
(52) U.S. Cl.
CPC .......... *F16L 53/008* (2013.01); *F16L 53/002* (2013.01)
(58) Field of Classification Search
CPC .............................. F16L 53/008; F16L 53/002
(Continued)

(56) References Cited

U.S. PATENT DOCUMENTS 4,581,285 A * 4/1986 Mahefkey, Jr. ......... B32B 15/08
220/592.21
4,928,027 A * 5/1990 Deininger .............. H02K 44/10
310/11

(Continued)

FOREIGN PATENT DOCUMENTS

CN 1908499 A 2/2007
JP 10 47581 2/1998
(Continued)

OTHER PUBLICATIONS

Combined Chinese Office Action and Search Report issued Jun. 26, 2014 in Patent Application No. 201080070525.2 (with partial English translation and English translation of categories of cited documents).
Taiwan Office Action Issued Jan. 21, 2013 in corresponding Patent Application No. 100102773.
International Search Report Issued Jan. 25, 2011 in PCT/JP10/72101 Filed Dec. 9, 2010.

*Primary Examiner* — Quang D Thanh
*Assistant Examiner* — Kuangyue Chen
(74) *Attorney, Agent, or Firm* — Oblon, McClelland, Maier & Neustadt, L.L.P.

(57) ABSTRACT

A heating device which transfers heat isothermally to an object to be heated. The heating device includes: a block and a base plate which surround a pipe; a first heat insulating cover which covers an outer periphery of the block and the base plate and forms a first heat insulating layer; and a second heat insulating cover which covers an outer periphery of the first heat insulating cover and forms a second heat insulating layer. The first heat insulating cover includes first heat insulating covers fixed to the block and the base plate respectively. The second heat insulating cover includes second heat insulating covers fixed to each of the first heat insulating covers respectively. The heating device further includes snap locks which detachably fixes the second heat insulating covers.

12 Claims, 8 Drawing Sheets (58) Field of Classification Search
USPC .......... 219/535, 540, 553; 392/480, 484
See application file for complete search history.

(56) References Cited

U.S. PATENT DOCUMENTS

| | | | |
|---|---|---|---|
| 5,020,481 A * | 6/1991 | Nelson | F24H 1/182 |
| | | | 122/19.2 |
| 8,378,264 B2 * | 2/2013 | Nomoto | 219/385 |
| 2005/0274713 A1 * | 12/2005 | Malone | F16L 53/008 |
| | | | 219/535 |
| 2006/0231151 A1 | 10/2006 | Sasaki et al. | |
| 2007/0145737 A1 * | 6/2007 | Benninga | B23K 37/003 |
| | | | 285/123.3 |
| 2008/0283333 A1 * | 11/2008 | Long | A62B 1/10 |
| | | | 182/7 |

FOREIGN PATENT DOCUMENTS

| | | |
|---|---|---|
| JP | 2001 41350 | 2/2001 |
| JP | 2001 44186 | 2/2001 |
| JP | 2003 185086 | 7/2003 |
| JP | 2004 146508 | 5/2004 |
| JP | 2006 144942 | 6/2006 |
| JP | 2006 283807 | 10/2006 |
| JP | 2007 2986 | 1/2007 |
| TW | 200643331 | 12/2006 |
| TW | 200824835 | 6/2008 |
| WO | 2009 081466 | 7/2009 |

\* cited by examiner

HEATING DEVICE

TECHNICAL FIELD

The present invention relates to a heating device, and in particular, to a heating device configured to heat an object which requires a temperature control with high accuracy, such as a pipe or the like employed in a semiconductor manufacturing device.

BACKGROUND ART

Conventionally, in a semiconductor manufacturing device and the other manufacturing devices, in order to prevent a fluid from solidifying on an inner wall of a pipe used to transport the fluid, the pipe is heated by a heater and a temperature of the fluid to be transported inside the pipe is controlled with high accuracy. Such a conventional pipe heating device is disclosed in, for example, Japanese Patent Laying-Open No. 10-47581 (PTL 1) and WO 2009/081466 (PTL 2).

Figure 14:
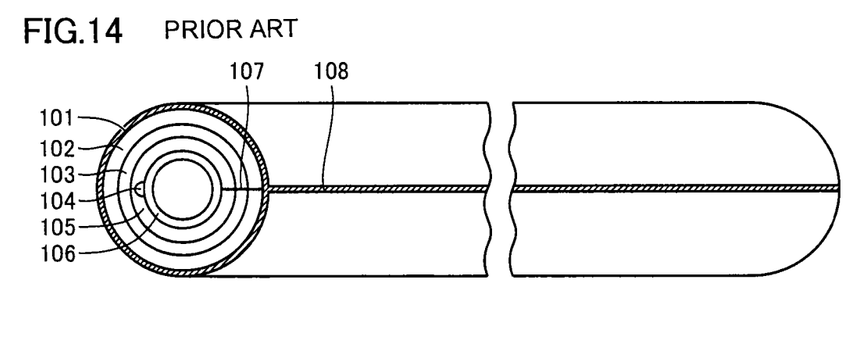
FIG. 14 is a perspective view illustrating an example of a conventional pipe heating device.

FIG. 14 is a perspective view illustrating an example of a conventional pipe heating device. The pipe heating device illustrated in FIG. 14 includes an isothermal heating material 105 surrounding a pipe 106 to be heated, a heating element 103 surrounding isothermal heating material 105, a heat insulating material 102 surrounding heating element 103 to prevent heat from being radiated to the outside, and an outer covering material 101 which fixes a lamination layer including isothermal heating material 105, heating element 103 and heat insulating material 102 on pipe 106. Both ends of outer covering material 101 are attached with a fastener 108. A slit 107 is disposed by cutting through isothermal heating material 105 and heat insulating material 102, and at the opposite side to slit 107, a groove 104 is formed to facilitate the attachment of the heating device to pipe 106.

Figure 15:
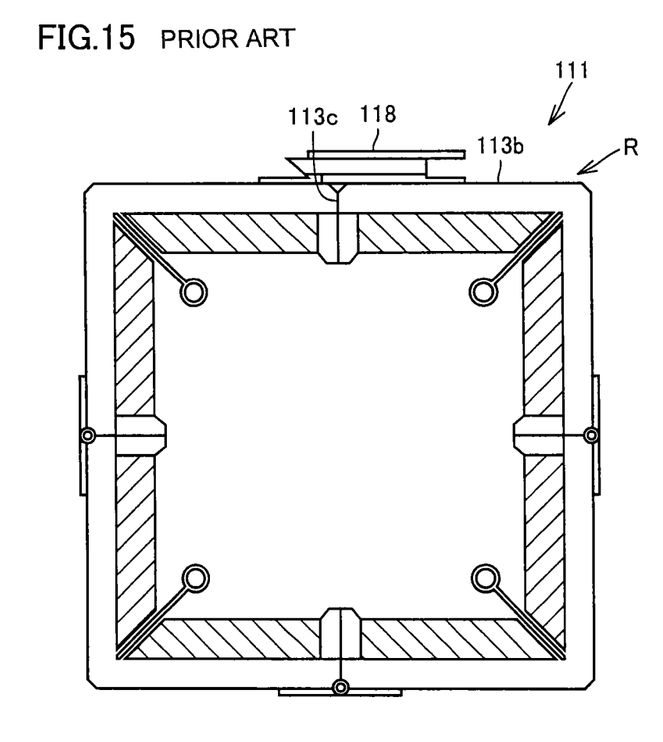
FIG. 15 is a section view illustrating another example of a conventional pipe heating device.

FIG. 15 is a section view illustrating another example of a conventional pipe heating device. A pipe heater 111 illustrated in FIG. 15 is made up of a plurality of shells formed into a polyhedral structure R fitting a pipe when mounted to surround the pipe. End surfaces of adjacent shells contact each other at a joint surface 113c. An outer wall 113b of a shell is disposed with snap locks 118. Snap locks 118 are disposed on outer wall 113b across joint surface 113c between the adjacent shells. By securing snap locks 118, the adjacent shells are fixed to each other, and pipe heater 111 is mounted around an outer circumferential wall of the pipe.

CITATION LIST

Patent Literature

PTL 1: Japanese Patent Laying-Open No. 10-47581
PTL 2: WO 2009/081466

SUMMARY OF INVENTION

Technical Problem

In the pipe heating device illustrated in FIG. 14, a temperature distribution occurs in pipe 106 due to different contact conditions between heating element 103 and isothermal heating material 105 and the distribution of heat generated by heating element 103. Thereby, it was difficult to heat pipe 106 isothermally. In order to improve the temperature distribution in pipe 106, it is necessary to thicken isothermal heating material 105 so as to improve the isothermal property on an inner surface of isothermal heating material 105; however, the thickening of isothermal heating material 105 will increase a heat capacity of isothermal heating material 105, which in turn increases an energy consumption, and meanwhile makes the device larger in size and heavier in weight.

Moreover, for the pipe heating device illustrated in FIG. 14, it is necessary to assembly isothermal heating material 105, heating element 103, heat insulating material 102, and an outer covering material 101 sequentially on pipe 106, which is a work operation costing time and labor. In a portion where isothermal heating material 105 contacts pipe 106, the amount of heat transfer from isothermal heating material 105 to pipe 106 increases through heat conduction. If the amount of heat transfer from isothermal heating material 105 to pipe 106 becomes uneven in a circumferential direction of pipe 106, the temperature distribution of pipe 106 will become irregular. In order to keep constant as much as possible the amount of heat transfer from isothermal heating material 105 to pipe 106, it is necessary to adjust the contact conditions between isothermal heating material 105 and pipe 106. Therefore, in assembling isothermal heating material 105 to surround pipe 106, it is necessary to make a fine adjustment, which reduces the convenience in assembling the device, in other words, causes such a problem that both the assembly time and cost increase.

Further according to the conventional pipe heating device illustrated in FIG. 14, since heat insulating material 102 is used, it is possible that dust resulted from heat insulating material 102 will disperse in the ambient environment; thereby, when the semiconductor manufacturing device is used in a clean room, it is especially possible that the indoor cleanliness level will be deteriorated.

Though pipe heater 111 illustrated in FIG. 15 is configured to have the heating element and the pipe disposed with a constant interval without using the isothermal heating material, and further have snap locks 118 disposed to improve the attaching and detaching efficiency; however, as long as the heat insulating material is still being used, the problem of deteriorating the cleanliness level of the ambient environment remains.

The present invention has been accomplished in view of the aforementioned problems and it is, therefore, a principal object of the present invention to provide a heating device capable of performing a temperature control on an object entirely with high accuracy, with an improved attaching and detaching efficiency and without polluting an ambient environment.

Solution To Problem

A heating device according to the present invention includes a heat transferring block of a high thermal conductivity which surrounds an object to be heated and transfer heat to the object. The heat transferring block includes a first heat transferring block and a second heat transferring block which are partitioned in a circumferential direction around the object and disposed in a surface contact to each other. The heating device further includes a heating section configured to generate heat and heat the heat transferring block, an inner cover disposed to cover an outer periphery of the heat transferring block so as to form a hollow space between the inner cover and the heat transferring block, and an outer cover disposed to cover an outer periphery of the inner cover so as to form a hollow space between the outer cover and the inner cover. The inner cover includes a first inner cover which is configured to cover the outer periphery of the first heat transferring block and is fixed to the first heat transferring block, and a second inner cover which covers the outer periphery of the second heat transferring block and is fixed to the second heat transferring block. The outer cover includes a first outer cover which covers the outer periphery of the first inner cover and is fixed to the first inner cover, and a second outer cover which covers the outer periphery of the second inner cover and is fixed to the second inner cover. The heating device further includes a fixation means configured to detachably fix the first outer cover and the second outer cover.

Preferably in the mentioned heating device, a heat pipe is formed inside at least one of the heat transferring block, and the heating section is configured to heat the heat pipe.

Preferably in the heating device, when the first outer cover and the second outer cover are fixed by the fixation means, the first inner cover and the second inner cover face each other with a gap interposed therebetween, and the first outer cover and the second outer cover face each other with a gap interposed therebetween.

Preferably in the heating device, the inner cover is formed of a material having a smaller superficial emissivity than a material forming the outer cover.

Preferably in the heating device, the inner cover is formed of a material having a smaller thermal conductivity than a material forming the outer cover.

Preferably in the heating device, the heat transferring block and the inner cover are detachably fixed by a fixation screw, and the fixation screw is formed of a stainless steel or a resin material. It is acceptable that the fixation screw is a countersunk screw.

Preferably in the heating device, the inner cover and the outer cover are detachably fixed by a fixation screw, and the fixation screw is formed of a stainless steel or a resin material.

Preferably, the heating device further includes a filmy member configured to cover the outer periphery of the outer cover, and the filmy member formed of a material having a greater superficial emissivity than a material forming the outer cover.

Preferably, the heating device further includes a radiation fin disposed on an outer surface of the outer cover.

Preferably in the heating device, the inner cover and the outer cover are formed integrally, and the hollow space formed between the inner cover and the outer cover is an enclosed space. It is acceptable that the enclosed space is vacuumized.

Advantageous Effects of Invention

According to the heating device of the present invention, it is possible to isothermally transfer heat to an object to be heated and perform a temperature control on the entire object with high accuracy.

DESCRIPTION OF EMBODIMENTS

Hereinafter, embodiments of the present invention will be described with reference to the drawings. In the drawings hereinafter, the same or corresponding parts will be assigned with the same reference numerals, and the descriptions thereof will be not be repeated.

Embodiment 1

Figure 1:
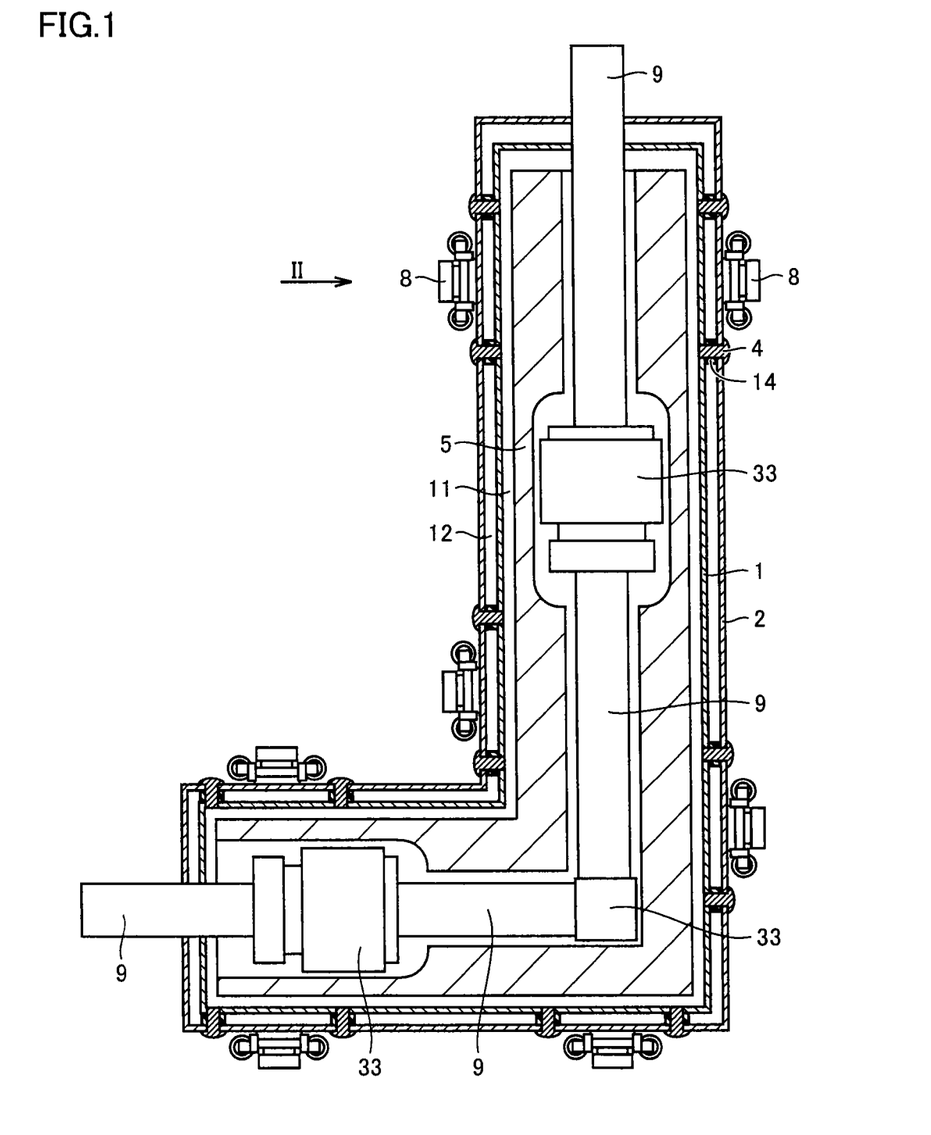
FIG. 1 is a partial section view illustrating a structure of a heating device according to Embodiment 1.
Figure 2:
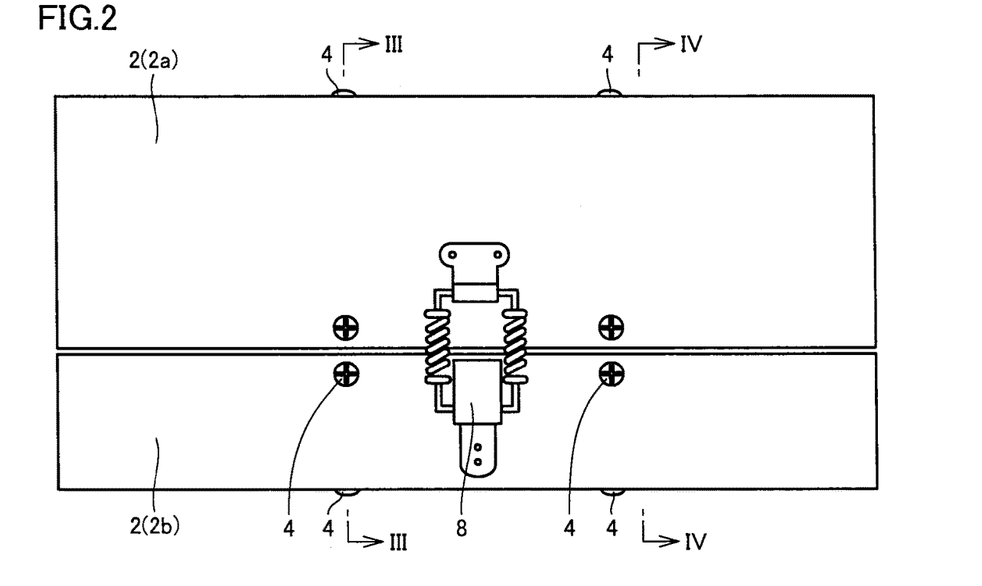
FIG. 2 is a lateral view of the heating device viewed in a direction of arrow II in FIG. 1.
Figure 3:
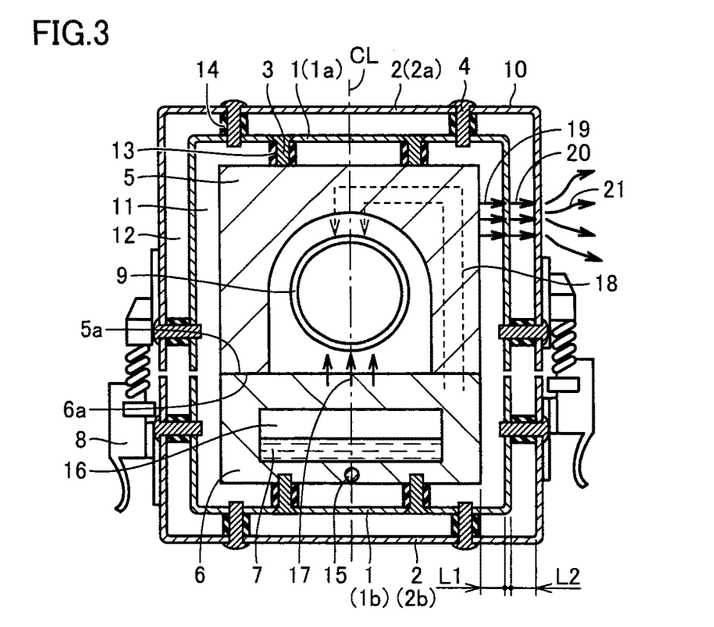
FIG. 3 is a section view of the heating device along line in FIG. 2.
Figure 4:
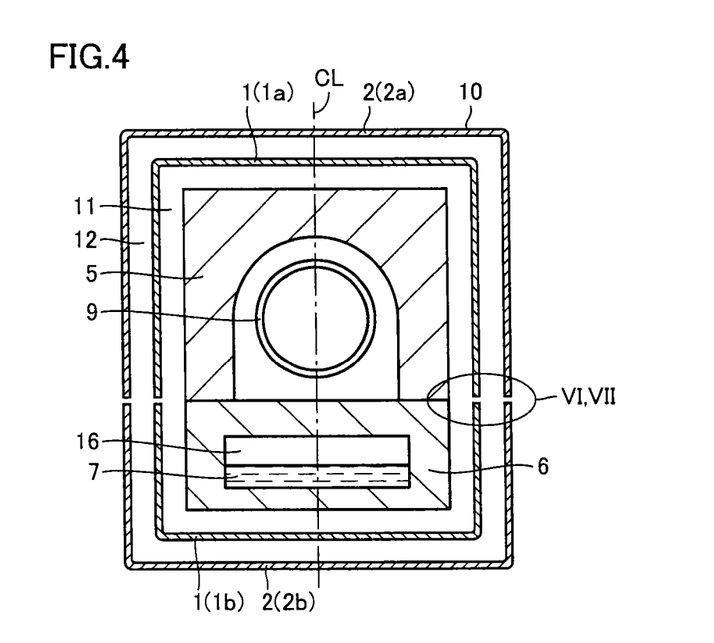
FIG. 4 is a section view of the heating device along line IV-IV in FIG. 2.

FIG. 1 is a partial section view illustrating a structure of a heating device according to Embodiment 1. FIG. 2 is a lateral view of the heating device viewed in a direction of arrow II in FIG. 1. FIG. 3 is a section view of the heating device along line in FIG. 2. FIG. 4 is a section view of the heating device along line IV-IV in FIG. 2. With reference to FIGS. 1 to 4, the structure of the heating device according to Embodiment 1 will be described in brief.

As illustrated in FIG. 1, the heating device according to the present embodiment encloses therein a pipe 9 to be used in a semiconductor manufacturing device, a food or medicine manufacturing device or the like for transporting fluid and a joint 33 configured to join a plurality of pipes 9. The heating device is used to heat pipe 9 and joint 33 isothermally so as to control with high accuracy the temperature of the fluid to be transported inside pipe 9. In the present embodiment, the heating device is illustrated as having pipe 9 and joint 33 as an object to be heated; however, the object is not limited to pipe 9 and joint 33. It is acceptable for the heating device to heat an arbitrary object such as an extending duct, various equipment or the like.

As illustrated in FIG. 3, the heating device according to the present embodiment includes a block 5 surrounding pipe 9 which serves as the object to be heated and a base plate 6 having a top surface 6*a* in contact with a bottom surface 5*a* of block 5. Block 5 and base plate 6 constitute a heat transferring block which surrounds pipe 9 and transfers heat to pipe 9. The heat transferring block includes block 5 serving as a first heat transferring block and base plate 6 serving as a second heat transferring block. The heat transferring block is partitioned into two members of block 5 and base plate 6 in a circumferential direction around pipe 9. Bottom surface 5*a* of block 5 is formed into a planar shape. Top surface 6*a* of base plate 6 is formed into a planar shape.

Block 5 and base plate 6 are disposed to have a surface contact to each other at bottom surface 5a and top surface 6a.

The heating device further includes a first heat insulating cover 1 serving as an inner cover covering an outer periphery of block 5 and base plate 6 and a second heat insulating cover 2 serving as an outer cover covering an outer periphery of first heat insulating cover 1. First heat insulating cover 1 includes a first heat insulating cover 1a on the side of block 5 serving as a first inner cover covering the outer periphery of block 5 and a first heat insulating cover 1b on the side of base plate 6 serving as a second inner cover covering the outer periphery of base plate 6. Second heat insulating cover 2 includes a second heat insulating cover 2a on the side of block 5 serving as a first outer cover covering the outer periphery of first heat insulating cover 1a on the side of block 5 and a second heat insulating cover 2b on the side of base plate 6 serving as a second outer cover covering the outer periphery of first heat insulating cover 1b on the side of base plate 6.

Block 5 and first heat insulating cover 1a on the side of block 5 are detachably fixed together by using a fixation screw 3. First heat insulating cover 1a and second heat insulating cover 2a on the side of block 5 are detachably fixed together by using a fixation screw 4. Block 5, first heat insulating cover 1a on the side of block 5, and second heat insulating cover 2a on the side of block 5 are fastened by fixation screws 3 and 4 into one unit.

Base plate 6 and first heat insulating cover 1b on the side of base plate 6 are detachably fixed together by using fixation screw 3. First heat insulating cover 1b and second heat insulating cover 2b on the side of base plate 6 are detachably fixed together by using fixation screw 4. Base plate 6, first heat insulating cover 1b on the side of base plate 6, and second heat insulating cover 2b on the side of base plate 6 are fastened by fixation screws 3 and 4 into one unit.

An outer surface of second heat insulating cover 2 is mounted with snap locks 8 serving as an example of a fastening member detachably fixing second heat insulating cover 2a on the side of block 5 and second heat insulating cover 2b on the side of base plate 6. Snap locks 8 are fixed on second heat insulating covers 2a and 2b located at the outmost periphery of the heating device, and the attachment of the heating device around the pipe 9 or the detachment of the heating device therefrom is performed by closing or by opening snap locks 8. Accordingly, it is easy to attach or detach the heating device, which enables an easy maintenance of the heating device.

After pipe 9 is disposed in a hollow space formed in block 5, by joining and fixing the unit on the side of block 5 and the unit on the side of base plate 6, pipe 9 is disposed as being sandwiched between the unit on the side of block 5 and the unit on the side of base plate 6. Pipe 9 is disposed without contacting either an inner wall surface of the hollow space formed in block 5 or top surface 6a of base plate 6.

As illustrated in FIG. 3, the hollow space formed in block 5 is formed by hollowing from bottom surface 5a, and is configured to have a pair of planar wall surfaces extending in parallel to each other in a direction orthogonal to bottom surface 5a and a cross-sectionally arc-shaped wall surface joining the pair of planar wall surfaces. Pipe 9 is arranged in the hollow space formed in block 5 with an equal distance from the outer periphery thereof to the cross-sectionally arc-shaped wall surface. The hollow space in block 5 is formed so that the distance from the outer periphery of pipe 9 to the cross-sectionally arc-shaped wall surface is equal to the distance from the outer periphery of pipe 9 to top surface 6a of base plate 6. Such configuration permits an isothermal heating on the entire outer periphery of pipe 9 and a temperature control on the fluid flowing in pipe 9 with high accuracy.

An enclosed hollow portion is disposed inside base plate 6 and the enclosed hollow portion is formed into a vacuum space which is depressurized through air evacuation. When a working fluid 7 is injected at an appropriate amount into the hollow portion, which is a vacuum-depressurized enclosed space, and working fluid 7 is retained in the hollow portion thereafter, a heat pipe 16 is formed accordingly.

Base plate 6 includes a heater 15 serving as a heating source for heating heat pipe 16. It is possible to adopt an arbitrary heating source as heater 15. Typically, for example, an electric heater, a heat medium circulating heater or an inductive heater may be adopted. When heater 15 serving as an example of a heating section generates heat, the heat is transferred directly to base plate 6, and thereafter the heat is transferred to block 5 through the intermediary of base plate 6.

Figure 5:
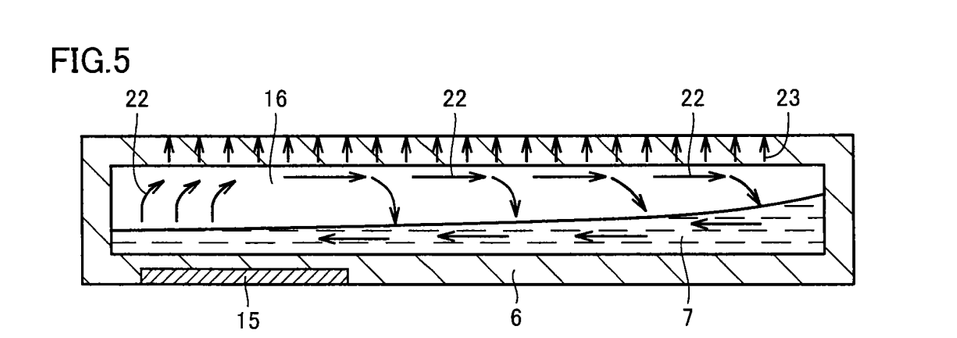
FIG. 5 is a section view schematically illustrating a heat transfer inside a base plate according to Embodiment 1.

FIG. 5 is a section view schematically illustrating a heat transfer inside base plate 6 according to Embodiment 1. The flow of heat transfer from heater 15 to pipe 9 will be described with reference to FIG. 3 and FIG. 5. Working fluid 7 possesses such a property that it vaporizes when being heated and condenses after releasing heat (condensable property). In a high temperature portion (left side in FIG. 5) of base plate 6 where heater 15 is disposed, working fluid 7 is heated to generate vapor 22. Generated vapor 22 flows in the hollow portion formed in base plate 6 and condenses on the wall surface of a low temperature portion having a relative low temperature in the hollow portion to release the latent heat to heat the hollow portion isothermally. Due to the gravity, the condensed fluid circulates back to working fluid 7 retained on the bottom surface of the hollow portion. Repetition of the mentioned actions allows the heat transfer from the high temperature portion to the low temperature portion.

As illustrated in FIG. 3, a heat current 23 released from vapor 22 heats pipe 9 in such a way that it is separated into two currents including a heat current 17 which comes from top surface 6a of base plate 6 for warming up pipe 9 directly and a heat current 18 which comes through the intermediary of the inner portion of block 5 with heat transferred from base plate 6 for warming up pipe 9. Thereby, if a gap is present between block 5 and base plate 6, it becomes a major factor to interfere the flow of heat current 18 as a heat insulating air layer. Therefore, it is necessary to perform a machining process of smoothening precisely bottom surface 5a of the block and top surface 6a of the base plate so as to reduce the surface roughness as much as possible.

In order to heat pipe 9 isothermally, block 5 covering pipe 9 is formed of a material of a high thermal conductivity represented by a metal material such as aluminum or copper. It is desirable that block 5 is made of aluminum, since it is possible to make block 5 lighter and it is possible to improve the heat transfer efficiency through radiation by anodizing the surface of block 5 facing pipe 9. If block 5 is made of copper, it is possible to make the thermal conductivity higher.

In order to heat pipe 9 isothermally, base plate 6 covering pipe 9 is formed of a material of a high thermal conductivity represented by a metal material such as aluminum or copper. It is desirable that base plate 6 is made of aluminum, since it is possible to make base plate 6 lighter and it is possible to improve the heat transfer through radiation by anodizing the surface of base plate 6 facing pipe 9. It is desirable that base plate 6 is made of copper, since it is possible to make the thermal conductivity higher and it is possible to use water having a favorable thermal property as working fluid 7 in the heat pipe.

Heater 15 is configured to have a thermal contact with base plate 6 so as to heat heat pipe 16 disposed in base plate 6. As illustrated in FIG. 3, heater 15 is embedded in base plate 6. Heater 15 may at least have a thermal contact with base plate 6 so as to be capable of transferring heat to heat pipe 16 through the intermediary of base plate 6. In addition to the configuration where heater 15 is embedded in base plate 6 as illustrated in FIG. 3, it is also acceptable that heater 15 is configured to have a contact with the outer periphery of base plate 6. If heater 15 can heat an arbitrary portion of heat pipe 16, the entire heat pipe 16 can be heated isothermally; thereby, heater 15 is not limited to be disposed at the position illustrated in FIG. 3.

Herein, "thermal contact" refers to such a situation that the heat is directly transferred between base plate 6 and heater 15 and the heat transfer efficiency is sufficiently high. This is not limited to such a situation that both members are contacting each other via a direct mechanical contact. For example, either a situation where heater 15 is integrated with base plate 6 through soldering, welding or the like or a situation where heater 15 has an indirect contact with base plate 6 with a medium having a high thermal conductivity interposed therebetween is included in the thermal contact.

In the heating device according to the present embodiment, in order to maintain with high accuracy the temperature distribution of pipe 9 and to reduce an energy consumption by reducing the amount of heat radiated to the ambient environment, a first heat insulating cover 1 and a second heat insulating cover 2 are disposed to surround block 5 and base plate 6.

A first collar 13 is inserted between block 5 and first heat insulating cover 1 and between base plate 6 and first heat insulating cover 1 and is fixed by first fixation screw 3 from the outside of first heat insulating cover 1, and thereby, block 5 and base plate 6 are spaced by a certain interval from first heat insulating cover 1. Block 5 and base plate 6 are disposed to have no contact with first heat insulating cover 1, and typically the outer periphery of block 5 and base plate 6 is disposed in parallel to first heat insulating cover 1. As a result, a gap is formed between first heat insulating cover 1 and each of block 5 and base plate 6, and accordingly, a first heat insulating layer 11 which is a hollow space is formed.

By causing the air layer to function as first heat insulating layer 11 without using any heat insulating material, it is not only possible to prevent dusts from being generated from the heat insulating material but also possible to reduce a heat current 19 illustrated in FIG. 3 from block 5 and base plate 6 to first heat insulating cover 1; thereby, the heat transfer from block 5 and base plate 6 to first heat insulating cover 1 can be inhibited.

An interval L1 denoting a thickness of first heat insulating layer 11 is defined by a height of first collar 13. If interval L1 is too small, the amount of heat transferred from block 5 and base plate 6 to first heat insulating cover 1 increases, and the increased amount of heat transferred to first heat insulating cover 1 leads to insufficient heat insulating effect. If interval L1 is too great, not only the size of the heating device will become greater but also air convection will occur inside first heat insulating layer 11. When air convection occurs inside first heat insulating layer 11, the amount of heat transferred from block 5 and base plate 6 to first heat insulating cover 1 due to convection heat transfer increases, which decreases the heat insulating effect. In addition, when air convection occurs inside first heat insulating layer 11, air having a higher temperature flows to the upper side, which causes a temperature difference between vertically disposed members of the heating device.

Thereby, it is necessary to limit interval L1 to such an extent that air convection will not occur in first heat insulating layer 11. Generally, it has been considered that air convection is difficult to occur if the gap is not more than 10 mm, and together with the consideration that smaller interval L1 helps to achieve a compact heating device, it is appropriate to set interval L1 in a range of 3 mm to 5 mm.

Heat in block 5 is conducted to first heat insulating cover 1 through the intermediary of first fixation screw 3 and first collar 13. Thereby, it is desirable that the material of fixation screw 3 and first collar 13 has a small thermal conductivity. For example, a stainless steel which has a relatively small thermal conductivity among metals or a fluorinated resin which is heat-resistant even in a high temperature environment is suitable for forming first collar 13. Fixation screw 3 also requires mechanical strength; thereby, it is suitable that it is formed of, for example, a stainless steel or a high strength and heat resisting resin material such as PEEK (polyether ether ketone) or the like.

Heat transferred to first heat insulating cover 1 through the intermediary of first fixation screw 3 is conducted inside first heat insulating cover 1, which thereby increases the temperature of the entire first heat insulating cover 1. Thus, it is desirable that the material for first heat insulating cover 1 has a low thermal conductivity. Accordingly, the temperature increase in first heat insulating cover 1 caused by heat transferred from block 5 or base plate 6 through the intermediary of first fixation screw 3 will become small to inhibit heat from being transferred from fixation screw 3 through the intermediary of first heat insulating cover 1 to fixation screw 4, which contributes to improving the heat insulating effect. It is acceptable that first heat insulating cover 1 is formed of a material having a smaller thermal conductivity than the material used to form second heat insulating cover 2.

In order to reduce the amount of heat transferred to first heat insulating cover 1 from the radiation heat of block 5 so as to inhibit the temperature increase in first heat insulating cover 1, it is desirable that an inner surface of first heat insulating cover 1 has a small emissivity. Further, in order to reduce the amount of heat radiated from first heat insulating cover 1 to second heat insulating cover 2, it is desirable that an outer surface of first heat insulating cover 1 also has a small emissivity. It is acceptable that first heat insulating cover 1 is formed of a material having a smaller superficial emissivity than the material used to form second heat insulating cover 2. It is appropriate that the material for first heat insulating cover 1 is, for example, a stainless steel with a surface thereof polished.

Similarly, it is desirable that block 5 has a small superficial emissivity, and it is also desirable that block 5 has a surface thereof polished.

A second collar 14 is inserted between second heat insulating cover 2 and first heat insulating cover 1 and fixed by second fixation screw 4 from the outside of second heat insulating cover 2, and thereby, first heat insulating cover 1 and second heat insulating cover 2 are spaced from each other by a certain interval. First heat insulating cover 1 and second heat insulating cover 2 are disposed to have no contact with each other, and typically first heat insulating cover 1 and second heat insulating cover 2 are disposed in parallel to each other. As a result, a gap is formed between first heat insulating cover 1 and second heat insulating cover 2, and accordingly, a second heat insulating layer 12 which is a hollow space is formed.

By causing the air layer to function as second heat insulating layer 12 without using any heat insulating material, it is not only possible to prevent dusts from being generated from the heat insulating material but also possible to reduce a heat current 20 illustrated in FIG. 3 from first heat insulating cover 1 to second heat insulating cover 2; thereby, the heat transfer from first heat insulating cover 1 to second heat insulating cover 2 can be inhibited. Disposition of a plurality of heat insulating covers 1 and 2 to surround block 5 and base plate 6 so as to form a plurality of hollow gaps can reduce the amount of heat transferred to second heat insulating cover 2 which is disposed at the outmost periphery, and consequently to inhibit the temperature of second heat insulating cover 2 from increasing.

An interval L2 denoting a thickness of second heat insulating layer 12 is defined by a height of second collar 14. If interval L2 is too small, the heat insulating effect will be insufficient; however, if interval L2 is too great, not only the size of the heating device will become greater but also air convection will occur inside second heat insulating layer 12 to deteriorate the heat insulating effect. Similarly to interval L1, it is also appropriate to set interval L2 in a range of 3 mm to 5 mm.

When first fixation screw 3 is a pan head screw, the distance from the pan head of fixation screw 3 to second heat insulating cover 2 is smaller than the other parts; thereby, the thickness of second heat insulating layer 12 becomes uneven. If the thickness of second heat insulating layer 12 at the position where fixation screw 3 is disposed is relatively small, the amount of heat transferred from the screw head to second heat insulating cover 2 becomes relatively great, which causes a hot spot where the temperature of a local part of second heat insulating cover 2 is higher to occur on the local part of second heat insulating cover 2 immediately above first fixation screw 3. In this regarding, it is desirable that a countersunk screw is used as first fixation screw 3 so that the screw head of fixation screw 3 will not protrude into second heat insulating layer 12.

It is desirable that the material of second fixation screw 4 and second collar 14 has a small thermal conductivity. Accordingly, the amount of heat conducted to second heat insulating cover 2 through the intermediary of fixation screw 4 or second collar 14 will become small, and consequently it is possible to inhibit the ambient temperature around fixation screw 4 from increasing locally on the surface of second heat insulating cover 2. For example, a stainless steel or a fluorinated resin which is resistant even in high temperature environment is suitable for second collar 14. Fixation screw 4 also requires mechanical strength; thereby, it is suitable that it is formed of for example, a stainless steel or a high strength and heat resisting resin material such as PEEK or the like.

Since second heat insulating cover 2 is disposed at the outmost periphery of the heating device and taken into consideration that second heat insulating cover 2 may be contacted by a human body, it is desirable that the superficial temperature of second heat insulating cover 2 is low. In order to increase a heat current 21 illustrated in FIG. 3 radiated from second heat insulating cover 2 so as to increase heat to be radiated to the ambient environment from the surface of second heat insulating cover 2 for the purpose of lowering the superficial temperature of second heat insulating cover 2, it is desirable that the surface of second heat insulating cover 2 has a great emissivity. It is acceptable that second heat insulating cover 2 is formed of a material having a greater superficial emissivity than the material used to form first heat insulating cover 1. Alternatively, it is acceptable to have the outer surface of second heat insulating cover 2 covered by a filmy member which is formed of a material having a greater superficial emissivity than the material used to form second heat insulating cover 2. It is acceptable to form the filmy member by coating a coating material 10 having a great emissivity such as black fluorinated resin coating or the like on the surface of second heat insulating cover 2.

In order to prevent a hot spot where the ambient temperature around second fixation screw 4 is higher locally from occurring on the surface of second heat insulating cover 2 illustrated in FIG. 2, it is acceptable that second heat insulating cover 2 is formed of a material of a high thermal conductivity represented by a metal material such as aluminum or copper. It is acceptable that second heat insulating cover 2 is formed of a material having a greater thermal conductivity than the material used to form first heat insulating cover 1.

Forming second heat insulating cover 2 of a material having a greater thermal conductivity can prevent heat transferred to second heat insulating cover 2 through the intermediary of fixation screw 4 from being retained at one location but spread the heat along a surface direction (orthogonal to a thickness direction) of second heat insulating cover 2, which enables the heat to be radiated from a wider range on second heat insulating cover 2. Thereby, it is possible to effectively suppress the formation of hot spot, and even if a hot spot is formed temporarily, it is easy to distribute the heat along the surface direction, and consequently to improve the ability of dissolving the hot spot naturally.

Figure 6:
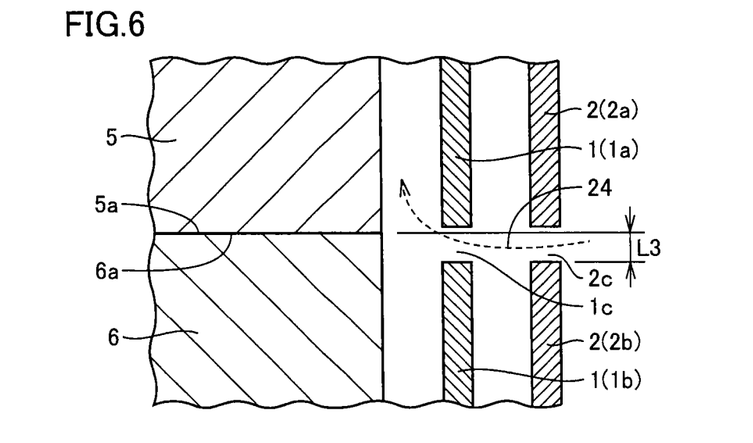
FIG. 6 is an enlarged section view of an example nearby a region VI, VII in FIG. 4.

FIG. 6 is an enlarged section view of an example nearby a region VI, VII in FIG. 4. When fixing block 5 and base plate 6 together to have a surface contact by the use of the snap locks 8, if first and second heat insulating covers 1a and 2a on the side of block 5 contact respectively first and second heat insulating covers 1b and 2b on the side of base plate 6, a gap will occur between bottom surface 5a of block 5 and top surface 6a of base plate 6. As a result, the heat current 18 from base plate 6 to block 5 will be interfered, which makes the temperature of block 5 lower than the temperature of base plate 6, and consequently makes it impossible to heat pipe 9 isothermally.

In order to avoid the abovementioned situation, a gap 1c having a length of L3 is disposed between an end surface of first heat insulating cover 1a on the side of block 5 and an end surface of first heat insulating cover 1b on the side of base plate 6 and a gap 2c having the same length of L3 is disposed between an end surface of second heat insulating cover 2a on the side of block 5 and an end surface of second heat insulating cover 2b on the side of base plate 6. When snap locks 8 secure second heat insulating cover 2a on the side of block 5 and second heat insulating cover 2b on the side of base plate 6, first heat insulating cover 1a on the side of block 5 and first heat insulating cover 1b on the side of base plate 6 face each other with gap 1c intervened therebetween. Meanwhile, second heat insulating cover 2a on the side of block 5 and second heat insulating cover 2b on the side of base plate 6 face each other with gap 2c intervened therebetween.

Thereby, in joining block 5 and base plate 6, it is possible to avoid the situation where the end surfaces of first heat insulating cover 1 or the end surfaces of second heat insulating cover 2 contact each other to hinder the surface contact between bottom surface 5a and top surface 6a. Resultantly, bottom surface 5a and top surface 6a can have a close contact with each other, ensuring heat current 18 to flow from base plate 6 to block 5 to heat pipe 9 circumferentially; thereby, it is possible to heat pipe 9 isothermally with certainty.

However, if length L3 of gaps 1c and 2c is made greater, the heat insulating performance of first heat insulating layer 11 and second heat insulating layer 12 will be deteriorated by an incoming air 24 from the ambient environment. Thereby, length L3 of gaps 1c and 2c is appropriate at 1 mm or less, and preferably around 0.5 mm.

Figure 7:
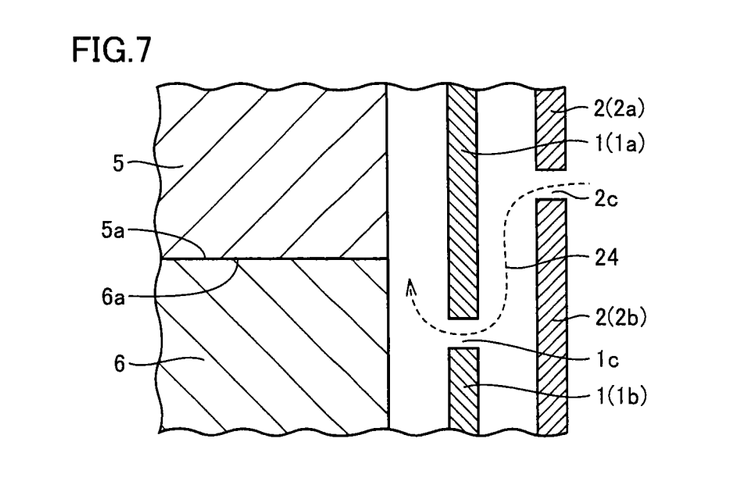
FIG. 7 is an enlarged section view of another example nearby the region VI, VII in FIG. 4.

FIG. 7 is an enlarged section view of another example nearby a region VI, VII in FIG. 4. In the example illustrated by FIG. 7, gap 1c between first heat insulating covers 1a and 1b is disposed at the side of base plate 6 and gap 2c between second heat insulating covers 2a and 2b is disposed at the side of block 5. Thereby, the position of gap 1c between first heat insulating covers 1a and 1b is deviated from the position of gap 2c between second heat insulating covers 2a and 2b to form a labyrinth between the gaps. Accordingly, the flow of incoming air 24 from the ambient environment into first heat insulating layer 11 can be inhibited, which makes it possible to reduce the flow amount of incoming air 24. Thereby, the cooling effect exerted by incoming air 24 on block 5 is reduced, enabling pipe 9 to be heated more isothermally.

Embodiment 2

Figure 8:
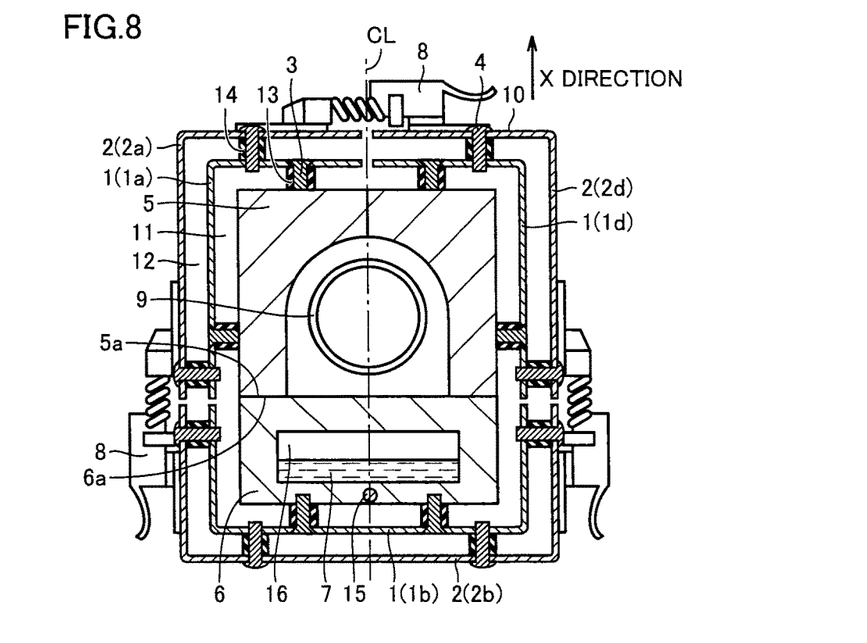
FIG. 8 is a section view illustrating a structure of a heating device according to Embodiment 2.

FIG. 8 is a section view illustrating a structure of a heating device according to Embodiment 2. The heating device of Embodiment 2 differs from that of Embodiment 1 in that block 5 is partitioned into two parts in the circumferential direction around pipe 9. In Embodiment 1, block 5, first heat insulating cover 1a and second heat insulating cover 2a are formed into one unit. However, even though block 5 is formed into two parts as illustrated in FIG. 8, it is possible to obtain the same effect of heating pipe 9 isothermally as in Embodiment 1.

Partitioning block 5 into two parts along a central line CL enables block 5 to be fabricated easily even though the structure of pipe 9 is complicated. Moreover, in a case where the presence of an obstruction in X direction illustrated in FIG. 8 makes it impossible to attach the unit including block 5 having the structure of Embodiment 1 around pipe 9, it is however possible to attach the heating device having the structure of Embodiment 2 around pipe 9 without any problem.

Embodiment 3

Figure 9:
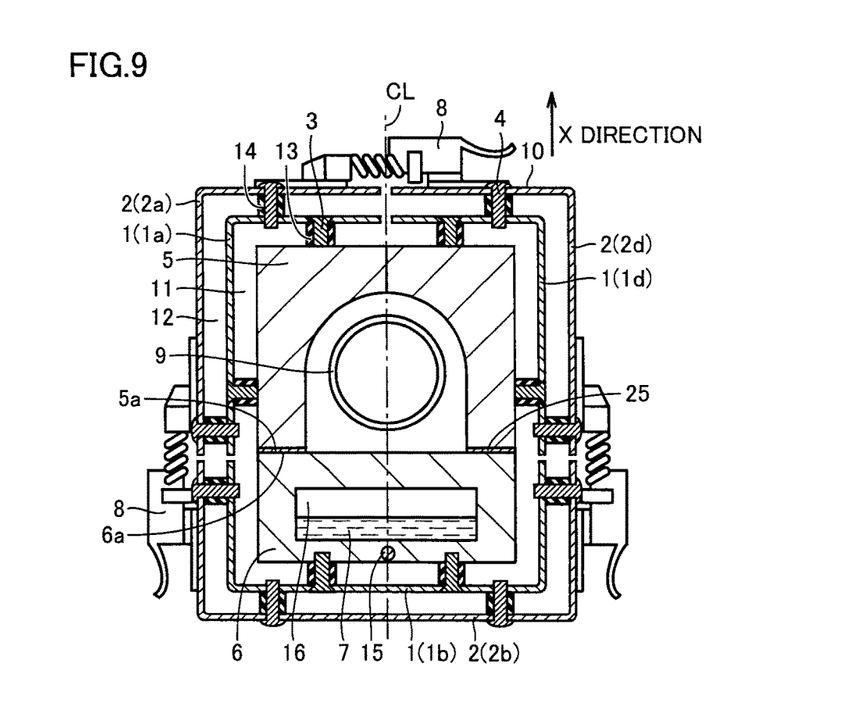
FIG. 9 is a section view illustrating a structure of a heating device according to Embodiment 3.

FIG. 9 is a section view illustrating a structure of a heating device according to Embodiment 3. The heating device of Embodiment 3 differs from that of Embodiment 2 in that a thermally conductive material 25 is sandwiched between block 5 and base plate 6. Sandwiching thermally conductive material 25 between block 5 and base plate 6 helps to reduce a thermal contact resistance between block 5 and base plate 6, which enables heat current 18 to flow from base plate 6 to block 5 efficiently. Consequently, it is possible to reduce the power consumption by heater 15.

As described in Embodiments 1 and 2, when bottom surface 5a of block 5 and top surface 6a of base plate 6 are formed to have a surface contact, in order to prevent a gap from occurring between block 5 and base plate 6, it is necessary to make small the surface roughness of bottom surface 5a and top surface 6a. Thereby, it is necessary to process precisely bottom surface 5a and top surface 6a, which increases working time required by the surface processing. However, if block 5 and base plate 6 are joined together with thermally conductive material 25 interposed therebetween, even though the surface roughness of bottom surface 5a and top surface 6a is great to a certain extent, it is possible to ensure the amount of heat transferred from base plate 6 to block 5. Accordingly, it is possible to reduce working time required to process block 5 and base plate 6, which in turn reduces the manufacture cost of the heating device.

Embodiment 4

Figure 10:
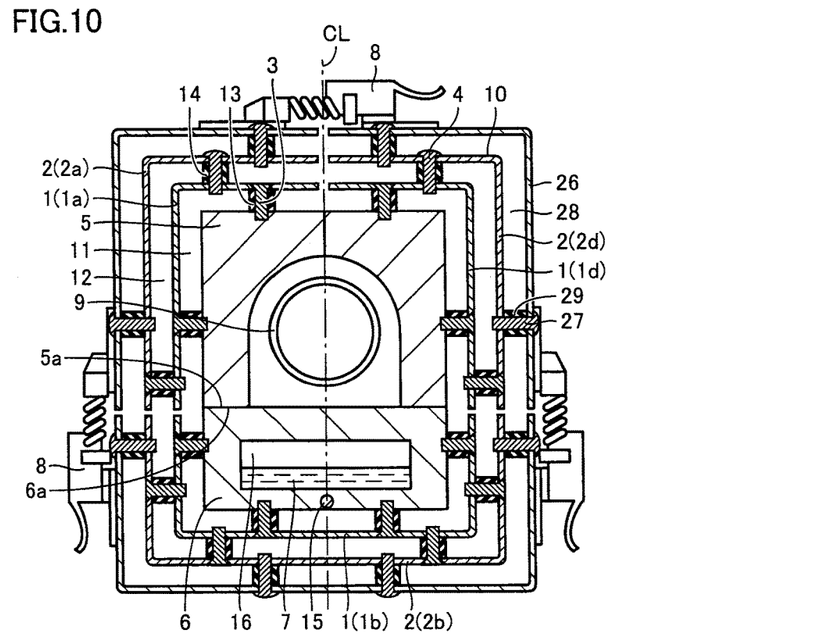
FIG. 10 is a section view illustrating a structure of a heating device according to Embodiment 4.

FIG. 10 is a section view illustrating a structure of a heating device according to Embodiment 4. In a case where the temperature of block 5 is high so as to maintain pipe 9 at a high temperature, the temperature of the outer surface of second heat insulating cover 2 may become high according to the structure of Embodiment 1; thereby, it is necessary to improve the heat insulating performance of the heating device. However, if the thickness of second heat insulating layer 12 or first heat insulating layer 11 is increased, air convection occurs in the heat insulating layers 11 and 12 to deteriorate the heat insulating performance; thereby, the increase of the thickness of the heat insulating layers 11 and 12 is limited.

Thereupon, the heating device of Embodiment 4 includes a third heat insulating cover 26 covering the outer periphery of second heat insulating cover 2. Second heat insulating cover 2 and third heat insulating cover 26 are integrally fixed by a third fixation screw 27. A third collar 29 is inserted between second heat insulating cover 2 and third heat insulating cover 26 and fixed by third fixation screw 27 from the outside of third heat insulating cover 26, and thereby, a third heat insulating layer 28 is formed between second heat insulating cover 2 and third heat insulating cover 26.

Accordingly, in addition to first heat insulating layer 11 and second heat insulating layer 12, the heating device includes third heat insulating layer 28. Increasing the number of the heat insulating layers contributes to increasing the thickness of the air layer from the outer periphery of block 5 and base plate 6 to third heat insulating cover 26, which thereby helps to improve the heat insulating performance of the heating device. Accordingly, it is possible to further reduce the amount of heat transferred from block 5 and base plate 6 to the outmost third heat insulating cover 26, which can make the outer surface temperature of third heat insulating cover 26 further lower.

Embodiment 5

Figure 11:
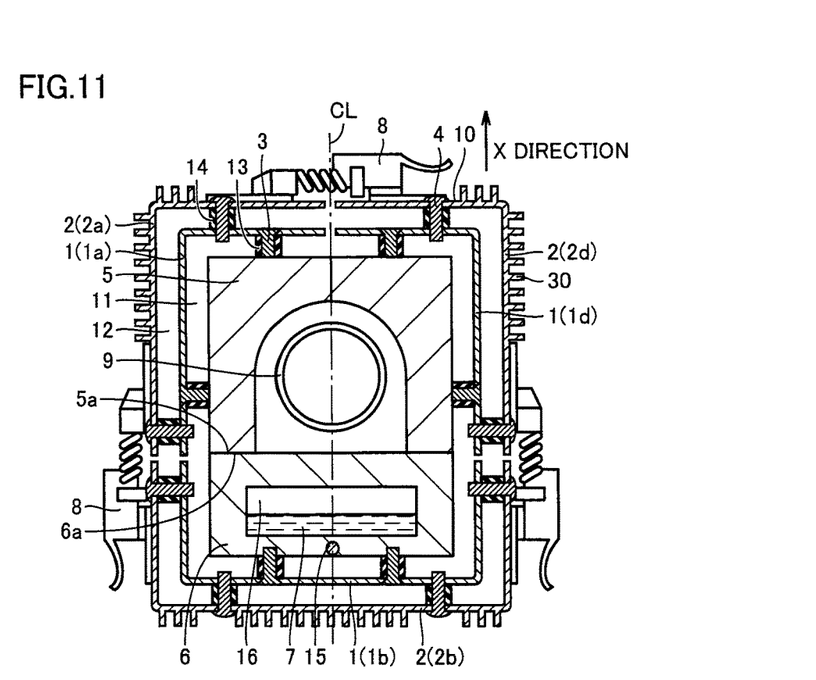
FIG. 11 is a section view illustrating a structure of a heating device according to Embodiment 5.

FIG. 11 is a section view illustrating a structure of a heating device according to Embodiment 5. In order to lower the surface temperature of second heat insulating cover 2, a coating material having a great emissivity is coated on the surface of second heat insulating cover 2 in Embodiment 1; while in Embodiment 5, a large number of radiation fins 30 are attached on the outer surface of second heat insulating cover 2.

The disposition of radiation fins 30 increases the heat radiation area for the outer surface of second heat insulating cover 2, which helps to radiate heat easily from second heat insulating cover 2 to the outside. Thereby, it is possible to radiate heat transferred from block 5 and base plate 6 to second heat insulating cover 2 to the outside through radiation fins 30 more efficiently, which can make the outer surface temperature of second heat insulating cover 2 further lower.

Embodiment 6

Figure 12:
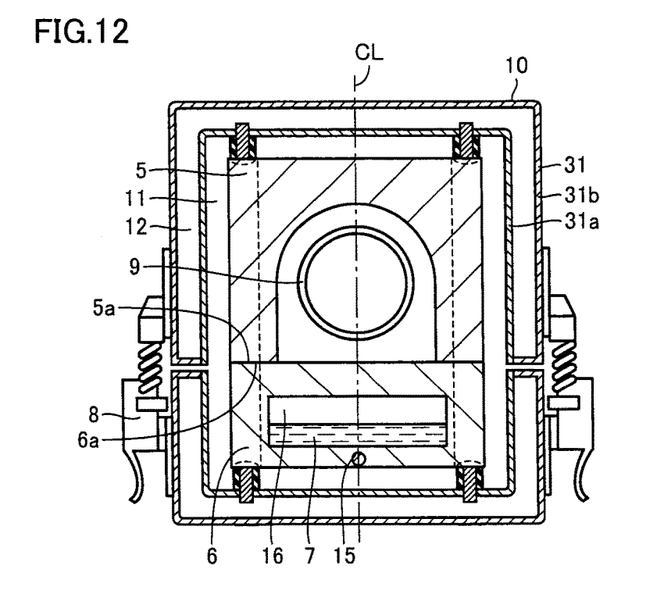
FIG. 12 is a section view illustrating a structure of a heating device according to Embodiment 6.

FIG. 12 is a section view illustrating a structure of a heating device according to Embodiment 6. From Embodiment 1 to Embodiment 5, first heat insulating cover 1 and second heat insulating cover 2 are fixed by using second collar 14 and second fixation screw 4 to form second heat insulating layer 12 between first heat insulating cover 1 and second heat insulating cover 2. In Embodiment 6, a piece of metal plate is bent to form an inner cover and an outer cover integrally, which thereby forms an integral heat insulating cover 31 of a hollow boxy shape.

Integral heat insulating cover 31 includes an inner section 31a and an outer section 31b. Inner section 31a corresponds to the inner cover which covers the outer periphery of the heat transferring block and forms a hollow space therebetween with the heat transferring block, and outer section 31b corresponds to the outer cover which covers the outer periphery of inner section 31a and forms a hollow space therebetween with inner section 31a. Thereby, first heat insulating layer 11 is formed between block 5 and inner section 31a, and between base plate 6 and inner section 31a; second heat insulating layer 12 is formed between inner section 31a and outer section 31b. Integral heat insulating cover 31 is formed into a boxy shape in such a way that an end portion of outer section 31b is bend toward inner section 31a until the end portion contacts inner section 31a, and the end portion of outer section 31b and inner section 31a are unified at the contacting location through welding or the like. Accordingly, second heat insulating layer 12, which is hollow between inner section 31a and outer section 31b, is formed into an enclosed space.

The formation of the heat insulating layer as mentioned above contributes to reducing the numbers of components constituting the heating device. Since there is no need to use fixation screw 4 to fix first heat insulating cover 1 and second heat insulating cover 2, it is possible to shorten the assembly time of the heating device and to further reduce the manufacturing cost.

Embodiment 7

Figure 13:
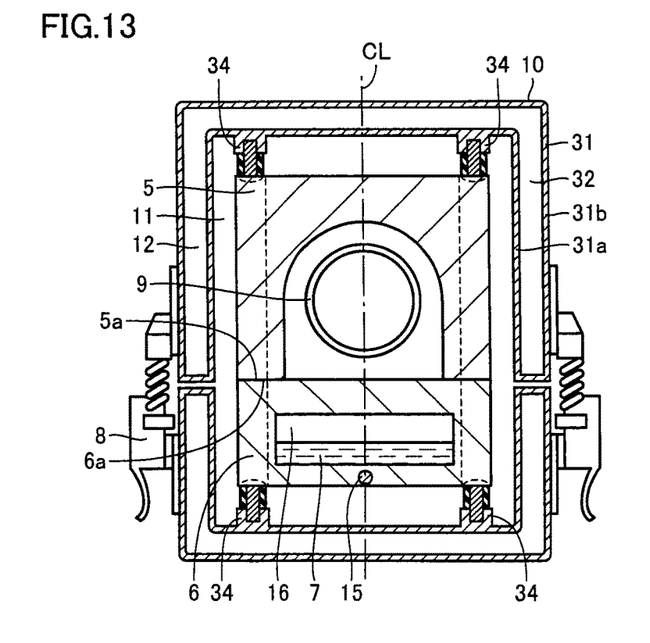
FIG. 13 is a section view illustrating a structure of a heating device according to Embodiment 7.

FIG. 13 is a section view illustrating a structure of a heating device according to Embodiment 7. Similar to Embodiment 6, the heating device of Embodiment 7 includes integral heat insulating cover 31; however, the heating device of Embodiment 7 differs from the heating device of Embodiment 6 in that the heat insulating layer inside integral heat insulating cover 31 is vacuumized and thereby to form the enclosed space between inner section 31a and outer section 31b into a vacuum space 32.

Accordingly, it is possible to remarkably improve the heat insulating performance of integral heat insulating cover 31 so as to further prevent heat from being transferred from inner section 31a of integral heat insulating cover 31 to outer section 31b thereof. Thereby, it is expected to further lower the surface temperature of second heat insulating cover 2.

In comparison to that illustrated in FIG. 12, it is necessary to increase the degree of vacuum of vacuum space 32 illustrated in FIG. 13, thereby, a boss 34 for receiving fixation screw 3 used to fix block 5 and base plate 6 with integral heat insulating cover 31 is provided on an inner surface of inner section 31a. Provision of boss 34 frees the necessity of penetrating inner section 31a so as to fasten fixation screw 3, thereby, it is possible to prevent air flowing through a penetrating hole provided for receiving fixation screw 3 from reducing the degree of vacuum of vacuum space 32. Outer section 31b illustrated in FIG. 13 is formed via bending a plain plate; however, taken into consideration that an inward pressure resulted from a pressure difference between vacuum space 32 and the outside environment will be applied to the outer surface of outer section 31b, it is acceptable to attach a reinforcement member such as a rib or the like on an inner periphery or an outer periphery of outer section 31b.

In the abovementioned embodiments, second heat insulating cover 2 is illustratively described as being joined and fastened by using snap locks 8. However, the fixation means which enables the fixation and detachment of second heat insulating cover 2 is not limited to snap locks 8, it is of course acceptable to use, for example, a hook-and-loop fastener, or a flange together with a wing screw as the fixation means. However, taken into consideration that transfer of a certain amount of heat to the fixation means will cause a temperature increase, snap locks 8 made of metal are considered preferable.

Although the embodiments of the present invention have been described respectively in the above, it is acceptable to combine the structure in each embodiment appropriately. It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

INDUSTRIAL APPLICABILITY

The heating device of the present invention is in particular beneficially useful as a heating device which transfers heat to a piping system of a fluid transporting device which is configured to transport a substance, such as reaction gas for depositing a material on, for example, a semiconductor wafer, a liquid crystal glass substrate or the like which requires a temperature control with high accuracy.

REFERENCE SIGNS LIST 1, 1a, 1b: first heat insulating cover; 1c, 2c: gap; 2, 2a, 2b: second heat insulating cover; 3, 4, 27: fixation screw; 5: block; 5a: bottom surface; 6: base plate; 6a: top surface; 7: working fluid; 8: snap locks; 9: pipe; 10: coating material; 11: first heat insulating layer; 12: second heat insulating layer; 13: first collar; 14: second collar; 15: heater; 16: heat pipe; 17, 18, 19, 20, 21, 23: heat current; 22: steam; 24: incoming air; 25: thermally conductive material; 26: third heat insulating cover; 28: third heat insulating layer; 29: third collar; 30: radiation fin; 31: integral heat insulating cover; 31a: inner section; 31b: outer section; 32: vacuum space; 33: joint; 34: boss

The invention claimed is:
1. A heating device comprising:
a heat transfer part which surrounds an object to be heated and transfers heat to said object, said heat transfer part being of a high thermal conductivity and including a first heat transferring block and a second heat transferring block which surround said object and a bottom surface of the first heat transferring block being in contact with a top surface of the second heat transferring block;

a heating section within one of the heat transferring blocks configured to generate heat and heat said heat transferring blocks;

an inner cover disposed to cover an outer periphery of said heat transferring blocks; so as to form a first hollow space between said inner cover and said heat transferring blocks, the first hollow space enclosing the heating section;

an outer cover disposed to cover an outer periphery of said inner cover so as to form a second hollow space between said outer cover and said inner cover, the second hollow space enclosing the heating section, said inner cover including a first inner cover which covers the outer periphery of said first heat transferring block and is fixed to said first heat transferring block, and a second inner cover which covers the outer periphery of said second heat transferring block and is fixed to said second heat transferring block, and said outer cover including a first outer cover which covers the outer periphery of said first inner cover and is fixed to said first inner cover, and a second outer cover which covers the outer periphery of said second inner cover and is fixed to said second inner cover; and a fixation means configured to detachably fix said first outer cover and said second outer cover.

2. The heating device according to claim 1, wherein a heat pipe is formed inside at least one of said heat transferring blocks, and said heating section is configured to heat said heat pipe.

3. The heating device according to claim 1, wherein when said first outer cover and said second outer cover are fixed by said fixation means, said first inner cover and said second inner cover face each other with a gap interposed therebetween, and said first outer cover and said second outer cover face each other with a gap interposed therebetween.

4. The heating device according to claim 1, wherein said inner cover is formed of a material having a smaller superficial emissivity than a material forming said outer cover.

5. The heating device according to claim 1, wherein said inner cover is formed of a material having a smaller thermal conductivity than a material forming said outer cover.

6. The heating device according to claim 1, wherein
said heat transferring blocks and said inner cover are detachably fixed by a fixation screw, and
said fixation screw is formed of a stainless steel or a resin material.

7. The heating device according to claim 6, wherein said fixation screw is a countersunk screw.

8. The heating device according to claim 1, wherein
said inner cover and said outer cover are detachably fixed by a fixation screw, and
said fixation screw is formed of a stainless steel or a resin material.

9. The heating device according to claim 1, further comprising a filmy member configured to cover an outer surface of said outer cover, wherein said filmy member is formed of a material having a greater superficial emissivity than a material forming said outer cover.

10. The heating device according to claim 1, further comprising a radiation fin disposed on an outer surface of said outer cover.

11. The heating device according to claim 1, wherein said inner cover and said outer cover are formed integrally, and said hollow space between said inner cover and said outer cover is an enclosed space.

12. The heating device according to claim 11, wherein said enclosed space is vacuumized.

* * * * *